United States Patent [19]

Brezosky

[11] 3,822,084
[45] July 2, 1974

[54] DOUBLE, REVERSED MOUNTING BOSS FOR PLASTIC TUB

[75] Inventor: Bernard J. Brezosky, Louisville, Ky.

[73] Assignee: General Electric Company, Louisville, Ky.

[22] Filed: Dec. 29, 1972

[21] Appl. No.: 319,556

[52] U.S. Cl............................... 312/253, 312/140
[51] Int. Cl............................................. A47b 91/00
[58] Field of Search ............ 312/253; 248/346, 344, 248/146, 359, 151, 361, 360, 19, 79, 229, 309–315; 220/74, DIG. 12, DIG. 14; 134/105, 107, 108; 85/35

[56] References Cited
UNITED STATES PATENTS

| | | | |
|---|---|---|---|
| 2,536,144 | 1/1951 | Siptrott | 248/146 X |
| 2,836,007 | 5/1958 | Dodds | 312/254 |
| 2,962,996 | 12/1960 | Smith | 248/311 X |
| 3,050,899 | 8/1962 | Stanton | 248/19 X |
| 3,141,577 | 1/1964 | Watson | 248/311 X |
| 3,476,261 | 11/1969 | Hanson et al. | 248/313 |
| 3,528,676 | 9/1970 | Marcandalli | 248/229 |

*Primary Examiner*—Paul R. Gilliam
*Attorney, Agent, or Firm*—Francis H. Boos

[57] ABSTRACT

The generally imperforate character of a plastic tub wall is retained while yet achieveing a rigid, internal tub component mounting anchored in an external metal frame by the separate securement of the internal component and metal frame to opposite sides of a common mounting boss integral with the tub wall. The mounting boss includes reversely directed, blind fastener receiving bores terminating within the body of the mounting boss. Threaded fasteners respectively engaging the internal tub component and external metal frame join the same in a rigid mounting via the commonly, interconnected mounting boss.

3 Claims, 4 Drawing Figures

PATENTED JUL 2 1974 3,822,084

3,822,084

DOUBLE, REVERSED MOUNTING BOSS FOR PLASTIC TUB

BACKGROUND OF THE INVENTION

The invention relates to large capacity front loading dishwashers of the type normally comprising a permanent installation and employing upper and lower dish supporting racks as opposed to the smaller, low capacity, portable and/or top loading dishwashers. The reason for the distinction is that the ultimate objective of the invention is the employment of a unipartite plastic tub in large capacity, front loading diswashers and while some of the problems presented by a proposed use of such a tub would be common to dishwashers of either type; the majority are distinct. Typical distinctions relate to increasing wall flexibility with increasing area, the absence of encompassing metal housings, greater tub shape complexity and additional interior tub mountings such as calrod stabilizers and dual rack support structures. Accordingly, the ensuing background discussion relates primarily to front loading dishwashers of the type normally adapted for a permanent, under cabinet, installation.

The high temperature, corrosive environment to which automatic dishwasher chambers are subjected dictates that the surfaces of those internal components in contact with such environment be either highly resistant, or immune, to corrosion. Corrosion resistant metals such as stainless steel represent a substantial cost factor in this highly competitive appliance field and the long term industry trend has been toward the use of inert materials to resist the corrosive effects of the chamber environment which are magnified adjacent the usual metal tub seam welds. Insofar as the tub itself, representing the far greater internal surface area exposure, is concerned; the general trend in the United States has been toward the application of an adherent plastic coating to the tub interior while European manufacturers have gone more to the use of plastic tub liners. In either event, the basic structural and design parameters that have prevailed since the advent of the modern front loading automatic dishwasher remained valid. This for the reason that overall diswasher design parameters, both as regards utility and structural integrity, are virtually unaffected by whether the conventional metal tub is coated, lined or exposed.

Conceptually, the use of a unipartite plastic dishwasher tub, i.e., one not requiring a more rigid backing or outer support structure, represents a substantial advance in the art. Exemplary are the greatly decreased cost factors of a molded plastic tub vis-a-vis that of a metal tub requiring a further coating or lining operation; reduction in finishing labor requirements and particularly tub welding operations; longer tub life due to corrosion resistance which is independent of faulty coating procedures or chipping; decreased thermal and acoustical transmission thus minimizing need for separate insulation; and a lesser inventory requirement for separable components susceptible of integral molding with the tub.

The reduction to practice of such a concept, as applied to front loading dishwashers on an assembly line basis, however, presents a myriad of problems which arise as a requirement for different approaches to those engineering considerations which had previously been predicated upon the use of a metal tub. The distinctions are primarily those associated with material strength, the unusually high temperature environment to which the tub is subjected, the mounting and sealing of internal tub component mountings and considerations relating to plastic molding procedures. Thus, while the structural integrity of a metallic box beam shape defined by the conventional front loading tub is more than sufficient to resist excessive wall deformation as a function of normal loading forces as during installation, adjustment or use and temperature variations from room ambient to approximately 255°F.; such normally applied loading forces would, in the absence of appropriate compensating structure, produce unacceptable wall deformation in a like configured plastic tub. The use of strand-like reinforcing fillers such as fiber glass would, seemingly, ameliorate the overall problem of wall deformation. In actuality, however, the presence of such reinforcing fibers not only effect tub discoloration, as discussed below, but their random distribution precludes an accurate prediction of thermal growth characteristics which is an essential parameter in the design of the necessary compensating structure herein discussed. Similarly, impact strength is normally of little moment in the design and installation of metallic tubs but is a matter of major concern in plastic tub design. Furthermore, various structural features appearing in a formed plastic tub as an incident of the forming operation create problems not previously associated with metal tub fabrication. Exemplary of the latter distinction are the presence, on the finished product, of mold lines and/or mold retention ribs creating localized areas of decreased impact resistance as well as the usual wall draft to permit removal of the product, or tub, from the forming mold. One primary disadvantage arising from this necessary wall draft concerns the mounting of the dishwasher rack supporting tracks in parallel.

In addition to the foregoing considerations which relate primarily to mounting and/or assembly procedures for larger capacity front loading machines, the desirability of precluding tub discoloration and the desirability of firewall separation of the tub and those electrical components constituting a fire hazard are common to all automatic dishwashing machines. As regards plastic tub discoloration, it is preferred to avoid the use of certain conventional strand type reinforcing fillers, such as chopped strand fiber glass, for the reason that their intersection with the interior plastic surface may provide a "bleed" path for food stains to permeate the tub structure.

The aforementioned firewall separation is a safety requirement but one which may be used to multiple advantage in connection with the construction herein disclosed, which is basically nothing more than a plastic tub equipped with a door and support frame, by utilizing the necessary firewall construction as an external power equipment support and anchorage for internal component mountings.

The prior art suggestions relating to the use of small capacity plastic tubs of the top loading type, as in U.S. Pat. No. 2,691,986 and the use of separate plastic tub components, as in U.S. Pat. Nos. 2,877,778 and 3,385,306 offer little in the way of guidelines as regards a practical reduction to practice of a large capacity front loading tub for the reason that most of the problems requiring solution are not present in smaller and- /or top loading units and particularly those which employ an enveloping metal housing.

The present invention relates to the sealing, rigid mounting and support of various of the internal components of a front loading plastic tub while other of the aforementioned matters are more fully described and claimed in the following, commonly owned, copending applications:

Ser. No. 319,201, filed Dec. 29, 1972, for Fill Funnel Construction for Plastic Tubs;

Ser. No. 319,203, filed Dec. 29, 1972, for Front Loading Dishwasher Employing Plastic Tub Construction;

Ser. No. 319,555, filed Dec. 29, 1972, for Thermal Growth Compensation and Mounting for Plastic Dishwasher Tub;

Ser. No. 319,348, filed Dec. 29, 1972, for Unit-Handled Roller Assembly for Plastic Tubs;

Ser. No. 319,202, filed Dec. 29, 1972, for Radiused Mold Walls for Plastic Tubs;

Ser. No. 317,368, filed Dec. 22, 1972, for Angled Levelling Foot for Domestic Appliance;

Ser. No. 319,200, filed Dec. 29, 1972, for Torsionally Reinforced, Skeletal Support Frame for Plastic Tubs;

Ser. No. 319,557, filed Dec. 29, 1972, for Impact Portection for Plastic Tub Employing Mold Retention Ribs;

Ser. No. 319,199, filed Dec. 29, 1972, for Plastic Tub Wall Alignment for Dishwasher Rack Mounting.

Elimination of the conventional front loading metal tub and the substitution therefor of a plastic tub necessitates the presence of mounting and/or support structure to compensate for those inherent characteristics previously available in the use of a metal tub which include a modulus of rigidity sufficient to preclude wall deformation and provide secure anchor points for component mountings and whose "box beam" tub shape insures adequate resistance to external loading forces. It is apparent that if the advantages of the invention, as regards decreased cost and weight, are to be retained the necessary mounting and support structure must not, in effect, comprise a confining tub support housing. Rather, a purpose of the invention is to provide an operative, front loading dishwasher unit having a plastic tub whose outer walls comprise the great majority of the outer dishwasher unit construction and would actually be exposed to view prior to installation of the dishwasher unit within an outer decorative housing, which decorative housing may comprise a free standing, portable unit or a permanent undercabinet installation.

SUMMARY OF THE INVENTION

It has been found that the requisite structural integrity can be imparted to the overall dishwasher and tub construction through the use of a tub support frame comprising a metal base assembly and a relatively narrow (as compared to the tub depth) metal collar upstanding from the base assembly and extending across the top and sidewalls of the tub immediately adjacent the open end thereof. The front, open end of the tub is then secured to the surrounding, composite "box beam" collar and base assembly thus anchoring the open end of the tub to a relatively rigid metal shape. The savings in fabrication cost and weight involved in bending a narrow metal strap into an approximate U-shape to form a collar and then joining the same to a base assembly as compared with the utilization of a complex metal shape to either form the tub or envelope a tub liner are obvious.

In addition to an obvious tub support role, the metal tub support frame is designed to perform the additional function of providing a secure anchorage for internal tub component mountings.

The tub itself is a unipartite, injection molded tub which is homogeneous throughout and thus exhibits no surface exposed, reinforcing fibers along which food stains could permeate the tub structure. More specifically, the tub is comprised of a homogeneous, unipartite, polypropylene based plastic.

In front loading dishwashers of the type herein disclosed which are designed for multiple daily usage over an expected dishwasher and tub lifetime in excess of 10 years, it is apparent that the tub walls, per se, having an exemplary wall thickness of less than 0.2 inch cannot be expected to provide the necessary internal component mountings. This primarily for the reason that the large area, relatively flexible walls do not provide a rigid mounting surface. A conventional approach involving the use of separable fasteners extending through the tub wall for anchoring an internal component to an external frame creates additional sealing problems which are magnified in the case of plastic tubs because of inherent cold flow characteristics. These problems are accommodated, in the present invention, by the formation of an integral mounting boss on the tub at the internal component mounting position and disposed in backing relation to the metal tub support frame. Each of the internal component and metal frame are then secured to the common mounting boss by separate screw threaded fasteners extending into spaced, blind bores opening at opposite sides of the mounting boss. The imperforate character of the tub wall mounting portion is thus retained obviating the need for separate sealing elements, a rigid mounting is achieved by virtue of the component anchorage to a metal frame and the likelihood of "play" developing at the connection because of plastic cold flow is diminished. The latter for the reason that applied torque loads are not concentrated along a single through bore but are spread over a relatively larger area imperforate mounting boss. In addition to the foregoing the use of dual, separable fasteners terminating in blind bores insures that if any looseness or "play" should develop at the connection, no leakage could occur. The raised boss design also serves an assembly locating function and reduces assembly time and inventory requirements for such separable components as seals, nuts, washers, etc.

DESCRIPTION OF THE PREFERRED EMBODIMENTS

Figure 1:
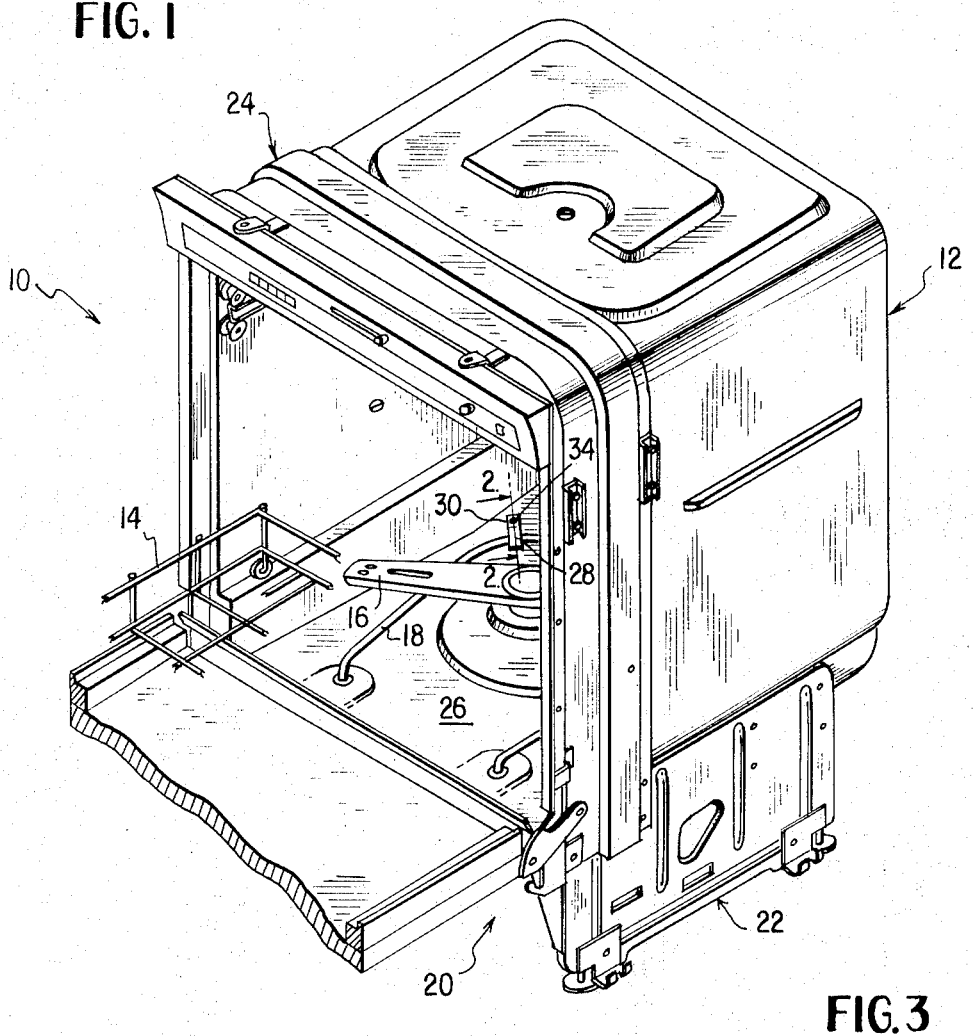
FIG. 1 is a front perspective of a front loading dishwasher employing a plastic tub.

In FIG. 1 is illustrated a front loading dishwasher 10 having a plastic tub 12 within which is mounted the usual dish supporting racks 14, spray bar 16 and calrod 18. The plastic tub as well as the remaining dishwasher equipment is supported on a frame 20 comrpised of a base assembly 22 and mounting collar 24. Calrod heating unit 18 is supported in spaced relation to lower tub wall 26 by a pair of Calrod heating unit stabilizers 28 having mounting brackets 30 constituting one internal component mounting chosen for examplary illustration of the present invention.

Figure 2:
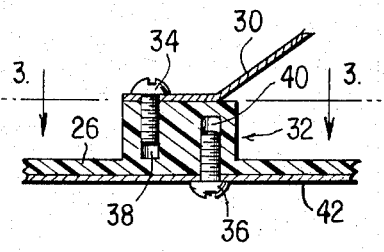
FIG. 2 is a sectional view taken along line 2—2 of FIG. 1.

The Calrod heating unit stabilizer mounting bracket is securely anchored to the underlying base assembly through the intermediary of a double, reversed mounting boss 32 outstanding from and integral with lower tub wall 26 and a pair of separable, screw threaded fasteners 34, 36 received within spaced, blind bores 38, 40 in the mounting boss. As will be apparent from FIG. 2, fastener 34 clamps bracket 30 to a generally imperforate lower tub wall portion constituted by mounting boss 32 while fastener 36 clamps the lower tub wall portion to the underlying base assembly 42 to provide internal component anchorage in a metal frame while preserving the generally imperforate character of the plastic wall.

The avoidance of a throughbore in tub wall 26 obviates any sealing requirements while the reception of fasteners 34, 36 within the body of mounting boss 32 reduces assembly time and inventory requirements for coacting fastener elements such as nuts and the like.

Figure 3:
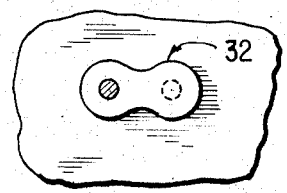
FIG. 3 is a plan view of the mounting boss of FIG. 2 as viewed along line 3—3.
Figure 4:
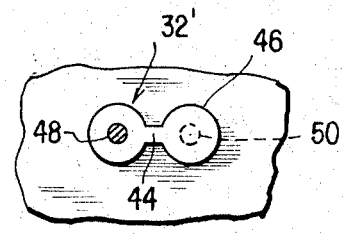
FIG. 4 is a view similar to that of FIG. 3 illustrating a modified boss design.

The modified boss design 32' (FIG. 4) differs from that of FIG. 3 only in the relatively narrow "bridge" 44 interconnecting the mounting bore protuberances 46 to provide the necessary resistance to shear force vectors parallel to mounting bases 48, 50.

While the background discussion of this specification is related primarily to front-loading dishwashers of the type normally adapted for a permanent undercounter installation as opposed to the type of dishwasher having a hinged top closure for top-loading, it should be emphasized that many such machines are commercially produced and purchased for indefinite use as a freestanding model adaptable at a later time by the owner to a built-in unit beneath a kitchen countertop to blend with the matching cabinet structure of the kitchen. Generally, the difference between the unit designed as a "convertible" and the unit to be immediately permanently installed is the inclusion of side, rear and top cabinet appearance panels to the basic unit structure as designed for permanent installation. Therefore, it should be understood that the present invention is specifically directed to the front-loading type of dishwasher structure whether of the generally lower-cost unit having no appearance cabinet enclosure or the more elaborate, temporarily portable unit designed for later modification for use in a fixed location.

I claim:

1. In combination with a domestic washing appliance having a metal tub support in surface to surface contact with the external surface of a generally imperforate, plastic tub wall portion to the internal surface of which wall portion is mounted a removable component, the improvement comprising: mounting means including a mounting boss integral with said imperforate, plastic tub wall portion; first and second removable fasteners respectively extending through said component and metal tub support and extending into said mounting boss in securing engagement therewith from opposite sides thereof, said first and second removable fasteners terminating short of extending through the body of said mounting boss thereby anchoring said component to said tub support without passing through said tub wall.

2. The combination of claim 1 wherein said removable fasteners comprise screw threaded fasteners.

3. The combination of claim 2 wherein said mounting boss includes blind fastener receiving bores extending into the body thereof from opposite sides of the imperforate tub wall portion; each of said fastener receiving bores being spaced transversely of the axes of the others; said fastener receiving bores being threadedly engaged with said screw threaded fasteners.

* * * * *